(12) United States Patent
Klenk et al.

(10) Patent No.: US 12,258,255 B2
(45) Date of Patent: Mar. 25, 2025

(54) APPARATUS AND METHOD FOR PRODUCING PLASTIC BOTTLES

(71) Applicant: KRONES AG, Neutraubling (DE)

(72) Inventors: Christoph Klenk, Wenzenbach (DE); Wolfgang Hausladen, Moetzing (DE)

(73) Assignee: KRONES AG, Neutraubling (DE)

( * ) Notice: Subject to any disclaimer, the term of this patent is extended or adjusted under 35 U.S.C. 154(b) by 1153 days.

(21) Appl. No.: 16/168,444

(22) Filed: Oct. 23, 2018

(65) Prior Publication Data

US 2019/0055113 A1 Feb. 21, 2019

Related U.S. Application Data

(63) Continuation of application No. 12/875,336, filed on Sep. 3, 2010, now Pat. No. 10,138,106.

(30) Foreign Application Priority Data

Sep. 7, 2009 (DE) .......................... 102009040363.9

(51) Int. Cl.
*B67C 7/00* (2006.01)
*B29C 49/36* (2006.01)
(Continued)

(52) U.S. Cl.
CPC .............. *B67C 7/002* (2013.01); *B29C 49/36* (2013.01); *B67C 7/004* (2013.01); *B29C 49/06* (2013.01);
(Continued)

(58) Field of Classification Search
CPC ... B67C 7/002; B67C 7/004; B67C 2003/227; B29C 49/36; B29C 49/06; B29C 49/6418
(Continued)

(56) References Cited

U.S. PATENT DOCUMENTS 4,164,997 A 8/1979 Mueller
4,509,639 A 4/1985 Thompson
(Continued)

FOREIGN PATENT DOCUMENTS

CN 1108207 A 9/1995
CN 101094800 A 12/2007
(Continued)

OTHER PUBLICATIONS

German Search Report for 10 2009 040 363.9 mailed May 2, 2010.
(Continued)

*Primary Examiner* — Sameh Tawfik
(74) *Attorney, Agent, or Firm* — MARSHALL, GERSTEIN & BORUN LLP

(57) ABSTRACT

Apparatus and method for producing plastic bottles. An apparatus for producing plastic bottles includes a molding machine to manufacture preforms for plastic bottles. The apparatus also includes a blow molding machine to receive the preforms from the molding machine and to stretch blow mold the preforms into bottles. The apparatus also includes a labeling machine to receive the bottles from the blow molding machine and to label the bottles. The molding machine is bloc-synchronized with the blow molding machine to space the molding machine a first distance from the blow molding machine. The blow molding machine being bloc-synchronized with the labeling machine to space the blow molding machine a second distance from the labeling machine.

20 Claims, 3 Drawing Sheets

(51) Int. Cl.
  *B29C 49/06* (2006.01)
  *B29C 49/64* (2006.01)
  *B67C 3/22* (2006.01)

(52) U.S. Cl.
  CPC .... *B29C 49/6418* (2013.01); *B67C 2003/227* (2013.01)

(58) Field of Classification Search
  USPC .......................................................... 53/268
  See application file for complete search history.

(56) References Cited

U.S. PATENT DOCUMENTS

| | | | |
|---|---|---|---|
| 4,543,770 A | 10/1985 | Walter et al. | |
| 4,697,691 A | 10/1987 | Zodrow et al. | |
| 4,803,055 A * | 2/1989 | Ueda | B65B 55/10 134/48 |
| 5,232,717 A * | 8/1993 | Voss | B29C 49/4205 198/803.12 |
| 5,259,912 A | 11/1993 | Cline | |
| 5,394,975 A * | 3/1995 | Bernhard | B65B 59/005 198/473.1 |
| 5,402,623 A * | 4/1995 | Ahlers | B67B 3/02 53/471 |
| 5,431,201 A | 7/1995 | Torchia et al. | |
| 5,437,521 A | 8/1995 | Ouellette | |
| 5,650,037 A * | 7/1997 | Larson | B65C 3/16 156/540 |
| 5,848,515 A * | 12/1998 | Catelli | B65B 55/02 53/167 |
| 5,863,571 A * | 1/1999 | Santais | B29C 49/421 425/526 |
| 5,871,079 A | 2/1999 | Nannini et al. | |
| 6,094,890 A | 8/2000 | Michellon et al. | |
| 6,119,433 A * | 9/2000 | Kitahora | B65B 55/02 53/167 |
| 6,298,638 B1 * | 10/2001 | Bettle | B65B 3/022 53/284.5 |
| 6,436,330 B1 | 8/2002 | Winter | |
| 6,510,674 B1 | 1/2003 | Case | |
| 6,622,878 B1 | 9/2003 | Frey | |
| 6,649,120 B1 | 11/2003 | Johnson | |
| 7,013,624 B2 | 3/2006 | Zwilling | |
| 7,140,870 B2 | 11/2006 | Nava | |
| 7,571,585 B2 | 8/2009 | Till | |
| 7,661,522 B2 | 2/2010 | Hausladen | |
| 7,731,022 B2 | 6/2010 | Zepf | |
| 7,765,776 B1 | 8/2010 | Leu et al. | |
| 7,877,967 B2 | 2/2011 | Monzel | |
| 8,028,815 B2 * | 10/2011 | Hahn | B65G 47/5113 198/347.1 |
| 8,047,357 B2 | 11/2011 | Braun et al. | |
| 8,112,969 B2 | 2/2012 | Backhaus et al. | |
| 8,202,079 B2 | 6/2012 | Litzenberg et al. | |
| 8,231,749 B2 | 7/2012 | Dent et al. | |
| 8,272,495 B2 | 9/2012 | Zech | |
| 8,442,673 B2 * | 5/2013 | Langosch | B65C 9/06 700/230 |
| 8,458,932 B2 | 6/2013 | Schnuckle | |
| 8,807,330 B2 * | 8/2014 | Kraus | B65G 47/847 198/803.9 |
| 8,985,340 B2 | 3/2015 | Zech | |
| 10,759,550 B2 | 9/2020 | Anderson et al. | |
| 2003/0116404 A1 | 6/2003 | Preti et al. | |
| 2004/0245069 A1 | 12/2004 | Hook et al. | |
| 2006/0086410 A1 | 4/2006 | Bernhard | |
| 2007/0017593 A1 * | 1/2007 | Bernhard | B67B 3/26 141/2 |
| 2007/0235906 A1 | 10/2007 | Trouillet | |
| 2008/0142336 A1 * | 6/2008 | Kronseder | B65G 21/18 198/347.1 |
| 2008/0223691 A1 * | 9/2008 | Nishi | B65G 29/00 198/470.1 |
| 2009/0077933 A1 | 3/2009 | Backhaus et al. | |
| 2009/0171489 A1 * | 7/2009 | Kramer | B65C 9/04 700/97 |
| 2009/0208601 A1 | 8/2009 | Shimomura | |
| 2010/0071830 A1 | 3/2010 | Putzer | |
| 2010/0089008 A1 | 4/2010 | Parini et al. | |
| 2010/0199604 A1 * | 8/2010 | Fischer | B67C 7/0073 53/425 |
| 2011/0056172 A1 | 3/2011 | Klenk et al. | |
| 2016/0052654 A1 | 2/2016 | Voth et al. | |

FOREIGN PATENT DOCUMENTS

| | | |
|---|---|---|
| DE | 1704022 A1 | 1/1971 |
| DE | 2436591 A1 | 1/1976 |
| DE | 2506409 A1 | 8/1976 |
| DE | 2507419 A1 | 9/1976 |
| DE | 2549144 A1 | 5/1977 |
| DE | 2621993 A1 | 12/1977 |
| DE | 3526237 A1 | 2/1987 |
| DE | 4207725 A1 | 9/1993 |
| DE | 4441700 A1 | 5/1996 |
| DE | 29723880 U1 | 4/1999 |
| DE | 19819731 A1 | 11/1999 |
| DE | 19824846 A1 | 12/1999 |
| DE | 29724903 U1 | 10/2005 |
| DE | 19741476 B4 | 1/2006 |
| DE | 102005015565 A1 | 10/2006 |
| DE | 202007008120 U1 | 8/2007 |
| DE | 102006023531 A1 | 11/2007 |
| DE | 102006035109 A1 | 1/2008 |
| DE | 102006026618 A1 | 3/2008 |
| DE | 102006053193 A1 | 5/2008 |
| DE | 102006059001 A1 | 6/2008 |
| DE | 102008010895 A1 | 8/2009 |
| EP | 1 350 612 A1 | 10/2003 |
| EP | 1017588 B1 | 7/2004 |
| EP | 1777163 A1 | 4/2007 |
| EP | 1911696 A1 | 4/2008 |
| EP | 2786949 A2 | 10/2014 |
| JP | 2008128944 A | 6/2008 |
| JP | 2010-155631 A | 7/2010 |
| WO | WO-0078664 A1 | 12/2000 |
| WO | WO-2005/073113 A2 | 8/2005 |
| WO | WO-2006/087109 A1 | 8/2006 |
| WO | WO-2006087088 A2 | 8/2006 |
| WO | WO-2006/097796 A2 | 9/2006 |
| WO | WO-2007/110122 A1 | 10/2007 |
| WO | WO-2007131701 A2 | 11/2007 |
| WO | WO-2008/055685 A1 | 5/2008 |
| WO | WO-2008/106921 A1 | 9/2008 |
| WO | WO-2008/145363 A1 | 12/2008 |
| WO | WO-2009/046910 A1 | 4/2009 |
| WO | WO-2009049848 A2 | 4/2009 |
| WO | WO-2009/101087 A1 | 8/2009 |
| WO | WO-2010055113 A2 | 5/2010 |

OTHER PUBLICATIONS

European Search Report for corresponding application No. EP 10 17 1692 dated Dec. 16, 2010.
Rotary Stretch-blow Moulders, Echo Block of SMI Group (Oct. 2023).
SMI ebs ergon Google search (Oct. 2023).
SMI Group website home page (May 2023).

* cited by examiner

APPARATUS AND METHOD FOR PRODUCING PLASTIC BOTTLES

CROSS-REFERENCE TO RELATED APPLICATION

This is a continuation of U.S. application Ser. No. 12/875,336, filed Sep. 3, 2010, which claims the benefit of priority of German Application No. 102009040363.9, filed Sep. 7, 2009. U.S. application Ser. No. 12/875,336 and German Application No. 102009040363.9 are hereby incorporated herein by reference in their entireties.

FIELD OF THE DISCLOSURE

The present disclosure relates to an apparatus and to a method for producing plastic bottles with a blow molding machine, a labeler and at least one further treatment machine, such as a rinser, sterilizer, filler, capper, or the like.

BACKGROUND

It is standard in the manufacture of labeled plastic bottles that plastic bottles are first produced in a rotary-type blow molding machine in a continuous way from blanks. The blow molding machine accommodates the heated blanks, also called preforms, in correspondingly designed blow molds in which these are then blown during rotation of the blow molding machine under high pressure and at a high temperature to form bottles.

In known methods, the bottles are filled and subsequently labeled downstream of the blow molding machine. However, it is also known that the finish-blown bottles are first labeled and then filled.

In general, there are long transfer paths between these different machines, partly also with interposition of buffers, so that facilities of that type are made relatively extensive, i.e. they need quite a lot of space.

SUMMARY OF THE DISCLOSURE

One aspect of the present disclosure is to develop a generic apparatus in such a way that with a spatially compact and space-saving arrangement the apparatus is nevertheless flexible and easily adaptable to different functions, and to provide a corresponding method therefor.

The apparatus according to the disclosure is distinguished in that transfer starwheels are arranged for the machine-to-machine transportation of the bottles in such a way that the bottles are transported without buffers between the at least three machines. The method protects the corresponding direct treatment of the bottles in direct sequence after passage through intermediate conveyor paths formed by transfer wheels. Suitable transfer wheels are e.g. known from WO 2006/087088 A2 (see FIGS. 9 and 10).

According to the disclosure the individual machines are thus directly interconnected, i.e. bloc-synchronized, via transfer starwheels. The transfer of the containers between the individual machines takes place via said starwheels, so that although the machines can be arranged in direct vicinity with each other without any long intermediate transportation belts, or the like, separation points are so to speak formed between the machines in the area of the transfer starwheels, which permits a flexible adaptation to different functions. Furthermore, transfer points may be provided in the area of the transfer starwheels for discharging and/or introducing containers so as to e.g. discharge useless or unneeded containers or to fill gaps. Especially in the case of transfer wheels with selectively controllable grippers, this can be realized without any problems. Such transfer points are of particular advantage in the area between a blow molding machine and one of the downstream machines.

In an advantageous configuration of the disclosure at least two transfer starwheels are interposed between the blow molding machine and the labeler, at least one of said starwheels serving pitch changing purposes. Hence, with this measure the transfer starwheels can serve not only transportation purposes between interconnected machines, but may also be configured as pitch changing starwheels, e.g. in a manner known per se as pivoting or pivoting/pushing starwheels, so that they can then change the pitch of the bottle row to the required machine pitch for the subsequent labeler, or of a labeler to a subsequent machine, such as a rinser, filler, or the like.

In a further variant of the disclosure, it is intended that of the transfer starwheels at least one is provided for inspection functions and/or for circumferential alignment of the bottles. With this measure, at least one transfer starwheel is used for attaching inspection modules in its circumferential area, so that the quality (geometric data, absence of defects or damage) of the upstream operating steps can be checked or defects on the container can be detected, such defects possibly causing malfunctions in the downstream machines. Bottles detected to be defective might then be removed. For instance, the transfer starwheels present between blow molding machine and labeler may be provided for the inspection of the just finish-blown bottles, and the transfer starwheels downstream of the labeler may be provided for inspection of the label position and the label itself.

Advantageously, the whole apparatus is configured with the individual machines and transfer starwheels in such a way that a continuous, particularly constant, neck handling plane is also obtained for different bottle sizes or heights. It is intended in a further advantageous configuration of the disclosure that transportation and transfer from the blow molding machine takes place while maintaining the orientation or alignment in the removal position of the bottles from the blow mold up to the labeler for a position-correct labeling. With this measure an aligning or orienting process of the bottles for the position-correct infeed into the labeler is simplified or can be omitted altogether and additional aligning paths need not be provided, which in turn shortens the conveyor path.

In a further advantageous configuration of the disclosure it is intended that the transfer starwheels are configured as individual modules with their own drive and standard interface. Hence, the transfer starwheels form interfaces with respect to the upstream and/or downstream machines and, thanks to their individual drives (e.g. servomotors, mechanical coupling with decoupling function, or the like), they can decouple the machines from each other. For instance, when a transfer starwheel between the blow molding machine and the labeler is stopped, a decoupling between blow molding machine and labeler can take place, which is e.g. of advantage for eliminating a disorder. It is thereby made possible that e.g. machines that are still operative can be run in an empty state whereas e.g. the upstream ones are stopped. For instance, preferably the blow molding machine can still be run in an empty state while the labeler is stopped, e.g. by way of bottle ejection. This solution also offers a typing function for eliminating the malfunction without the need for running the upstream or downstream machines. Also in the case of retooling an operation of the individual machines independently of the others is of advantage. Finally, since the machines can be decoupled, it is also possible to improve operator protection because the transfer starwheels between adjoining machines can then be disabled, thereby reducing the risk of squeezing or drawing-in.

The transfer starwheels form not only the mechanical interface with the machines (modules) but in a figurative sense they also form interfaces with respect to automation and control. In choosing the number and arrangement of the transfer starwheels, it is also possible to further define the position or angular arrangement of the individual machines and their mutual distance. Likewise, the running direction can be varied accordingly, depending on the number of the transfer starwheels.

In a further advantageous configuration of the disclosure, the labeler is configured as a modular machine with change units for labeling, printing, aligning and/or inspection. When the labeler is configured in this way, the variable usability of the whole apparatus is enhanced because different labeling functions can then be realized in a simple way on the labeler by just changing the labeling units.

When the further treatment machine is a filler/capper combination which is bloc-synchronized via at least two transfer starwheels with the labeler, this will yield the aforementioned advantages also between treatment machine and filler/capper combination. There are short distances or paths while an independent stopping of the individual machines is nevertheless possible.

In a further configuration of the disclosure, the filler/capper combination may be followed by further treatment machines, e.g. a controlled distribution starwheel with which the bottles exiting from the filler/capper combination in spaced-apart relationship can be handed over to a multi-track packer. Such distribution starwheels are known per se, e.g. from DE OS 10 2006 023 531, the content of which is herewith referred to. When such a distribution starwheel is bloc-synchronized with the filler/capper combination, one will realize a space-saving alternative in which the bottles arriving in a row in spaced-apart configuration are handed over to a multi-track packer without the bottles contacting one another during this operation, i.e. the positive bottle handling is uninterruptedly maintained. Space-consuming displacement paths are thereby avoided. It is conceivable to maintain the neck handling of bottles up and into a packer, which is also designed for neck handling transportation, and to produce, possibly right away, a pitch of pack groups during transfer, which pitch corresponds to the machine pitch. The packer thereby also forms part of a synchronously drivable total bloc system, which is preferably feasible without intermediate buffering.

When the bottles are to be produced in a single-stage process, bloc-synchronization is also possible with a preform injection molding machine arranged upstream of the blow molding machine, which can preferably also take place via transfer starwheels (possibly with pitch changing function).

BRIEF DESCRIPTION OF THE DRAWINGS

The present disclosure shall now be explained and described in more detail with reference to the embodiments shown in the drawings, in which.

DETAILED DESCRIPTION OF THE PREFERRED EMBODIMENT

Figure 1:
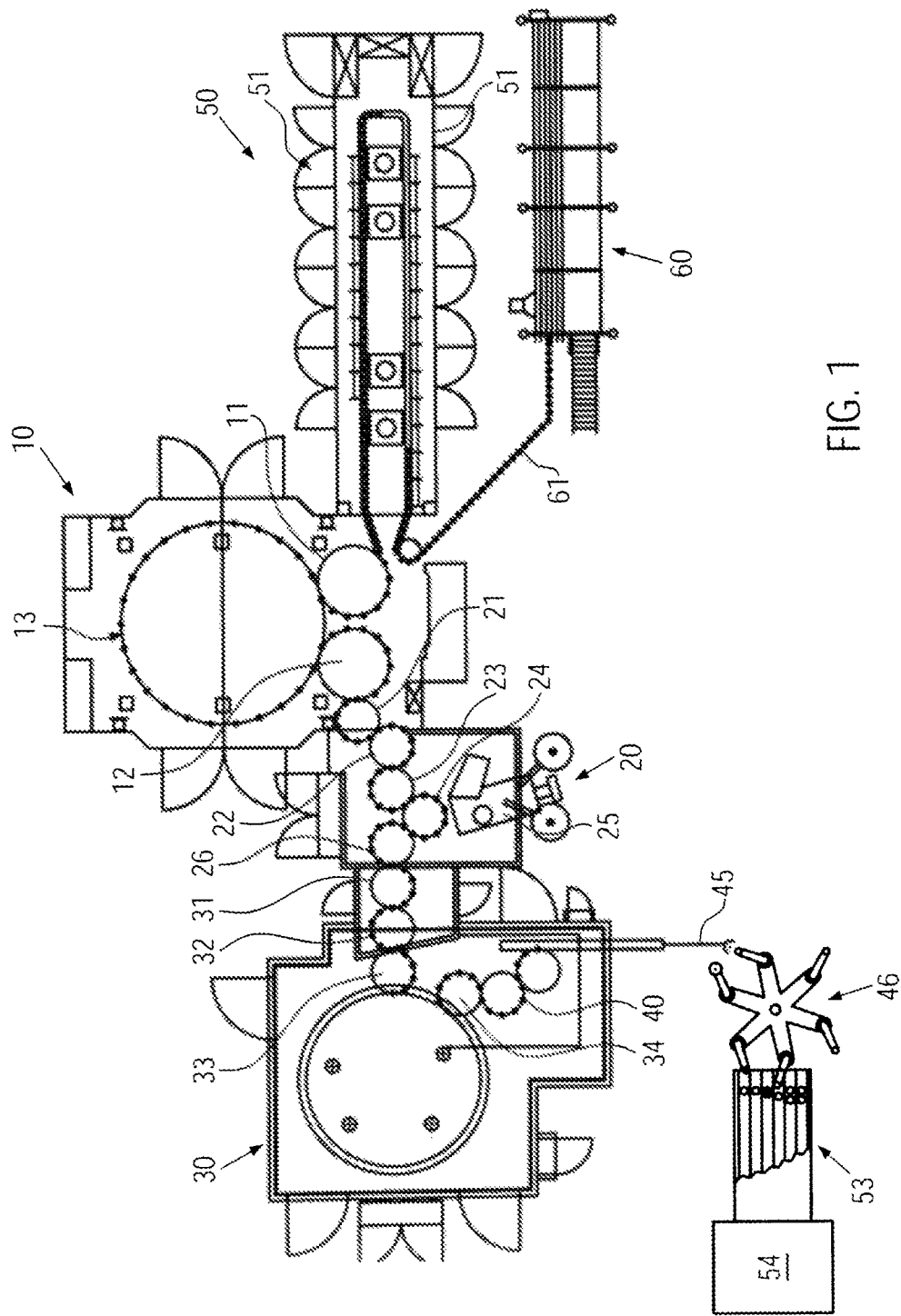
FIG. 1 is a schematic top view on an apparatus of the disclosure according to a first embodiment.

The apparatus according to the disclosure comprises various machines for producing, labeling and, in the illustrated example, for filling and capping plastic bottles. In detail, the illustrated apparatus comprises—in the sequence of the individual treatment stages—a preform supply 60, a heater 50, the blow molding machine 10, the labeler 20 and the filler/capper combination 30, 40 as well as a downstream controlled distribution starwheel 46 that transfers the bottles arriving at the discharge belt 45 in a single row to the multi-track discharger 53. The discharger 53 may already be part of a subsequent packer 54, which is e.g. designed for the groupwise packing of bottle packs in shrink film and/or a carton blank. The packer may e.g. be designed in conformity with DE 42 07 725 A1 and/or DE 44 41 700 A1, i.e. preferably with neck guides for the at least sectionwise suspended transportation of bottles. However, conventional packing machines with bottom-supported bottle transportation via conveyor belts are also useable.

As can be seen in the figure, the individual machines are closely interconnected or bloc-synchronized at short distances and are only separated from one another by interposed transfer starwheels. In detail, the preforms/bottles pass through the stations described hereinafter in the following way:

First of all, the preforms are separated in the preform separator 60 and supplied via an infeed path 61 to the heating module 50. At said place they pass along the heating or conditioning path with heating devices 51 and are thereby heated to the temperature needed for blow molding. The heating device is directly bloc-synchronized with the blow molding machine 10 and transfers the preforms via the infeed starwheel 11 into the blow molding carousel 13. The plastic containers then blown into bottles pass from there via the outfeed starwheel 12 to the two transfer starwheels 21 and 22 interposed between blow molding machine 10 and labeler 20.

In these transfer starwheels the bottles can optionally be given a pitch possibly different in the labeler and can optionally already be inspected and/or circumferentially aligned according to a specific feature for labeling to as to detect and/or sort out defective bottles. The transfer starwheels have their own drives (not shown in more detail) and can thus interrupt the bottle stream between the blow molding machine 10 and the labeler 20.

The illustrated labeler comprises the infeed starwheel 23, the labeling carousel 24 and the outfeed starwheel 26. A labeling unit 25 adjoins the carousel 24. In this area the bottles passing therethrough are labeled and/or printed (possibly also the labels themselves). The labels can be removed from a container in a precut form or made from a label strip by separation. However, it is also possible to process self-adhesive labels or sleeves, and the sleeves may here be stretch or shrink sleeves. In the case of conventional labels it is also possible to process shrinkable film material which after conventional winding onto a bottle, e.g. in combination with an initial and final gluing process, can be fitted by heat treatment to the bottle contour. Combined equipment variants are also feasible. In the labeling carousel a bottom support can preferably be implemented by way of a contour-matched bottom piece so as to avoid any bulging of the bottle bottom, which is still in a soft state and is loaded by internal pressurization during labeling; advantageously, the bottom is cooled and solidified at the same time.

The outfeed starwheel 26 of the labeler will then again hand over the bottles to two transfer starwheels 31 and 32, on which an inspection and/or pitch change can be carried out again. Preferably, it is checked in the area of these transfer starwheels whether the labels are correctly positioned and are free from damage, and a new pitch, as is needed for the downstream filler, is effected if necessary.

The transfer starwheel 32 then transfers the bottles to the infeed starwheel 33 of the filler 30, in which the bottles are filled. The bottles will then pass via the outfeed starwheel 34 into the capper 40 from where they are further transported to the discharger path 50. The bottles arriving there at the distance of the pitch of the capper 40 can then be removed from the discharger belt 45, e.g. by a controlled gripping starwheel 46, and handed over to a multi-track discharger 53. Said dischargers may e.g. be chains or belts with grippers (not shown in more detail) for the suspended and possibly completely bottom-free transportation of the bottles.

Since the blow molding machine is bloc-synchronized with the labeler and the filler/capper combination 30, 40 just via a few transfer starwheels, a very compact design is accomplished on the whole together with enhanced flexibility because at the functional separation points formed by the transfer starwheels 21, 22 and 31, 32, respectively, a decoupling between the machines is possible both during operation and for maintenance purposes.

Figure 2:
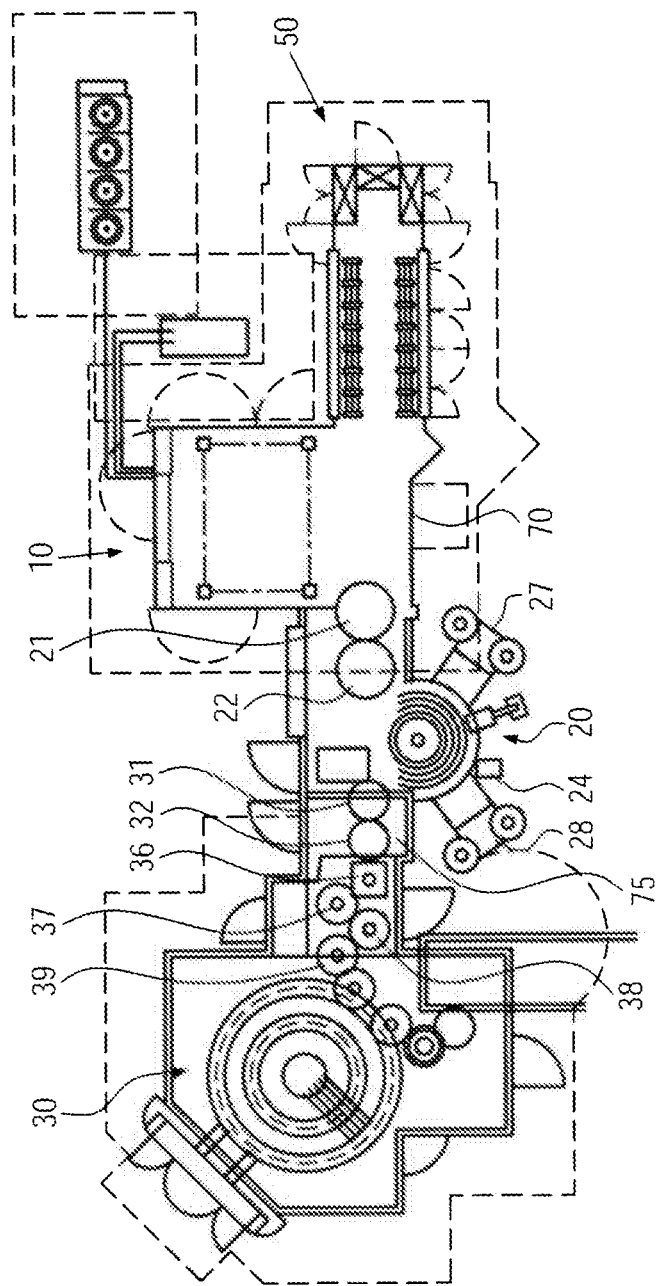
FIG. 2 is a schematic top view on a second embodiment.

In the variant shown in FIG. 2, the basic components and the fundamental structure are the same as in the variant shown in FIG. 1. That is why the same reference signs are also used. What is here not shown is the preform supply 60. The heating module 50 is of a slightly different construction without any functional differences ensuing from this.

The labeler 20 is configured as a modular machine in the case of which separate units 27 and 28 that are freely standing on the periphery of the carousel 24 are docked in specific positions. These units 27 and 28 can be changed or easily exchanged and replaced by other units, so that very different labeling tasks can be performed without difficulty. The units may have assigned thereto supply stations (not shown in more detail) possibly with fully automatic splicing and with a plurality of label supply rolls so as to ensure a labeling operation that is as uninterrupted as possible.

As another difference with respect to the variant shown in FIG. 1, four further transfer starwheels 36 to 39 are arranged between the two transfer starwheels 31 and 32. In the area of said transfer starwheels, particularly the bottoms of the bottles, which are normally still hot and have left the blow molding machine just shortly before, are actively cooled, which ensures that the bottles are adequately cooled prior to their infeed into the filler and are thus stable. This is particularly important in cases where CO2-containing beverages are filled under pressure in the filler. In the case of hot bottle bottoms the bottom area might then get damaged and the bottoms might detach during biasing if the bottles were still too hot and instable.

As a further difference with respect to the variant shown in FIG. 1, a protective housing 70 is arranged around the whole system, the housing enclosing the system components such that possibly even different pressure and atmosphere ranges and sometimes even different cleanroom classes can be generated in the area of the blow molding machine, labeling unit and/or filler if e.g. a sterile processing/environment should be required. Especially in the area of the transfer starwheels 31 and 32, a kind of air separation preferably takes place through arrangement of a corresponding cover 75, so that possibly glue-containing ambient air from the area of the labeler cannot diffuse in the direction towards the filler and wet air can also not escape out of the area of the filler into the other direction. This airlock helps to keep the filler area clean by preventing external contamination.

The protective sheath 70 can be configured on the whole such that a real housing is created that surrounds the whole apparatus over the whole circumference and then gives access to the individual machines and assemblies via doors and openings (not shown in more detail).

Very compact, closed and operative compact systems are created with the assembly according to the disclosure, said systems being highly flexibly while requiring little space and providing modular construction options.

Of course, in the variant shown in FIG. 2, a bloc-synchronized controlled distributor starwheel may also be arranged on the outfeed of the filler, the distributor starwheel transferring the bottles exiting in a row to a multi-track discharger/packer.

Figure 3:
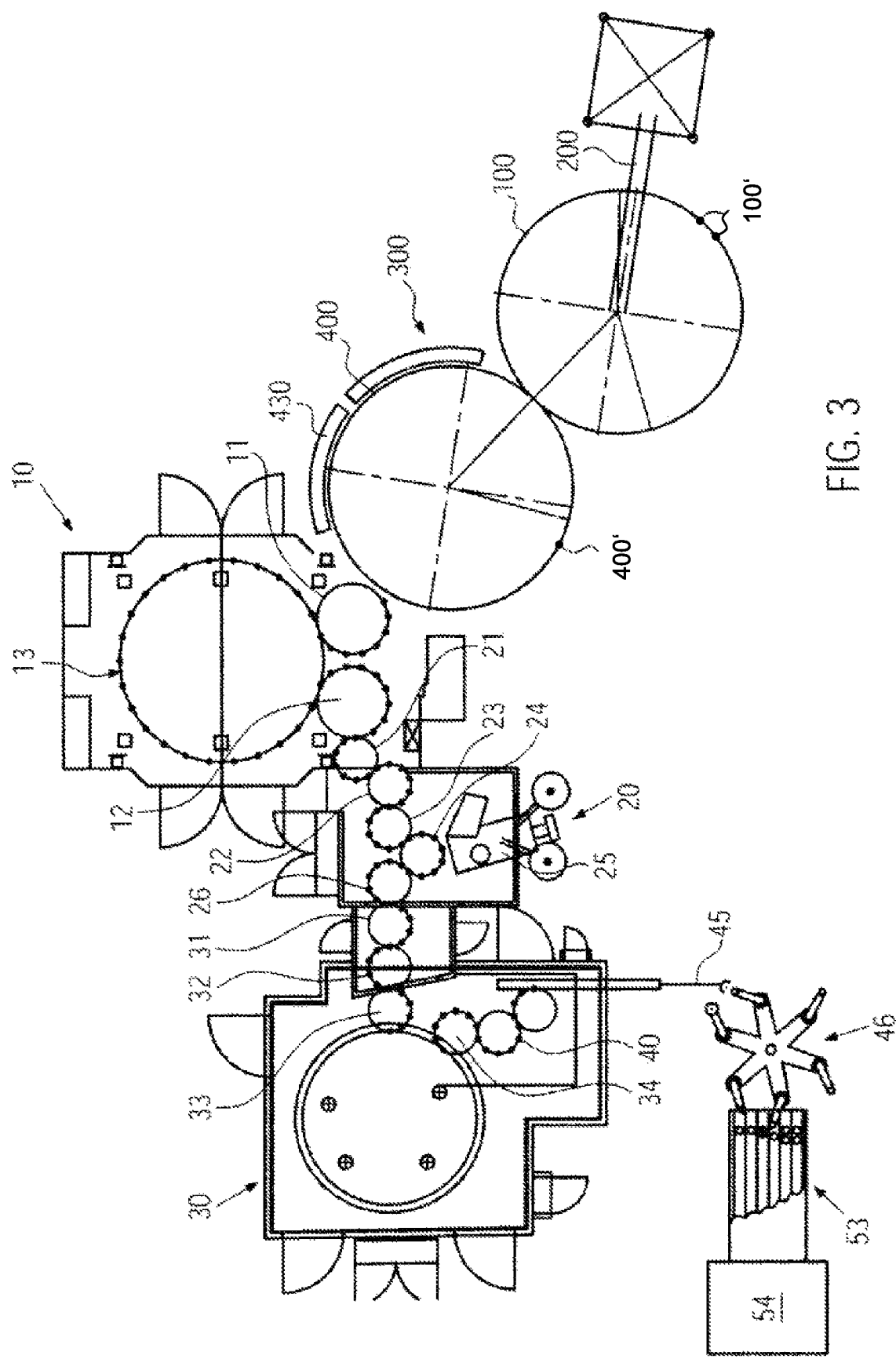
FIG. 3 is a schematic top view on a third embodiment of an apparatus according to the disclosure.

FIG. 3 shows a further development of the variant shown in FIG. 1 with a blow molding machine in a single-stage operating mode, i.e. directly upstream manufacture of the preforms for plastic bottles. The individual components of the apparatus V are of modular construction and arranged close to one another and comprise an injection rotor 100, which is preferably combined with an extruder 200 co-rotating at least in part and cooperates with an adjoining conditioning path 30, here configured as a conditioning circle, which has several cooling and/or heating stations 430 assigned thereto. The conditioning path 300 cooperates with a transfer starwheel 11, which in turn cooperates with the blow molding rotor for stretch blow molding the bottles. Many injection molds 100' are arranged on the injection rotor 100 for instance in the peripheral area. In the conditioning path 300 transfer spread mandrels 400' are provided as transfer elements on movable arms of a pitch changing starwheel 400. The transfer starwheel 11 also comprises transportation or transfer elements that hand over preforms issuing from the injection rotor 100 to the blow molds of the blow molding rotor 13. Further details of a suitable single-stage machine can be gathered from the document WO 2009/049848 A2, which is here explicitly included.

What is claimed is:

1. An apparatus for producing plastic bottles, the apparatus comprising:
    a molding machine to manufacture preforms for plastic bottles;
    a blow molding machine to receive the preforms from the molding machine and to stretch blow mold the preforms into bottles; and
    a labeling machine to receive the bottles from the blow molding machine and to label the bottles, the molding machine being bloc-synchronized with the blow molding machine to space the molding machine a first distance from the blow molding machine, the blow molding machine being bloc-synchronized with the labeling machine to space the blow molding machine a second distance from the labeling machine,
    wherein the molding machine is an injection molding machine.

2. The apparatus of claim 1, wherein the molding machine includes an extruder, an injection rotor, and a conditioning path, the injection rotor at least partially rotating with the conditioning path.

3. The apparatus of claim 2, wherein the conditioning path includes transfer spread mandrels and at least one of a cooling station or a heating station to enable the preforms to satisfy a threshold temperature for the stretch blow molding, the transfer spread mandrels includes a pitch changing starwheel to change a pitch of the preforms to be received by the blow molding machine.

4. The apparatus of claim 3, wherein the blow molding machine includes an infeed starwheel, a blow molding carousel, and an outfeed starwheel, the infeed starwheel being bloc-synchronized with the pitch changing starwheel, the blow molding carousel to receive the preforms from the infeed starwheel, and the outfeed starwheel to receive the bottles from the blow molding carousel.

5. The apparatus of claim 4, wherein the pitch changing starwheel is bloc-synchronized with the infeed starwheel.

6. The apparatus of claim 4, further including a first transfer starwheel and a second transfer starwheel interposed between the blow molding machine and the labeling machine to: 1) transfer the bottles from the blow molding machine to the labeling machine; and 2) enable decoupling of the blow molding machine and the labeling machine, wherein the first transfer starwheel receives the bottles directly from the outfeed starwheel.

7. The apparatus of claim 6, wherein the blow molding machine is bloc-synchronized with the labeling machine via the first and second transfer starwheels.

8. The apparatus of claim 6, wherein the infeed starwheel is a first infeed starwheel and the outfeed starwheel is a first outfeed starwheel, and wherein the labeling machine includes a second infeed starwheel, a labeling carousel, a labeling unit, and a second outfeed starwheel, the second infeed starwheel to receive the bottles from the second transfer starwheel, the labeling carousel to receive the bottles from the second infeed starwheel, the labeling unit to label the bottles carried by the labeling carousel, and the second outfeed starwheel to receive the bottles from the labeling carousel.

9. The apparatus of claim 1, wherein no buffers are positioned between the molding machine and the blow molding machine to enable the first distance to be achieved and no buffers are positioned between the blow molding machine and the labeling machine to enable the second distance to be achieved.

10. The apparatus of claim 1, further including an airlock and a filler, the filler to fill the bottles, the airlock positioned between the filler and the blow molding machine, the filler to receive bottles from the blow molding machine.

11. The apparatus of claim 10, wherein the airlock is to deter glue-containing air from diffusing to the filler.

12. The apparatus of claim 10, wherein the labeling machine and the filler are bloc-synchronized to enable a third distance between the labeling machine and the filler to be achieved.

13. The apparatus of claim 12, further including a first transfer starwheel and a second transfer starwheel interposed between the labeling machine and the filler, the labeling machine and the filler being bloc-synchronized via the first and second transfer star wheels.

14. The apparatus of claim 13, further including a capper bloc-synchronized with the filler to enable a fourth distance between the capper and the filler to be achieved, the capper to cap the bottles received from the filler.

15. The apparatus of claim 14, further including an outfeed starwheel of the filler to transfer bottles to the capper, the filler and the capper being bloc-synchronized via the outfeed starwheel.

16. A method of producing plastic bottles, the method comprising:
manufacturing preforms for plastic bottles using a molding machine;
receiving the preforms from the molding machine and stretch blow molding the preforms into bottles using a blow molding machine;
receiving the bottles from the blow molding machine and labeling the bottles using a labeling machine, the molding machine being bloc-synchronized with the blow molding machine to space the molding machine a first distance from the blow molding machine and the blow molding machine being bloc-synchronized with the labeling machine to space the blow molding machine a second distance from the labeling machine;
receiving the bottles from the labeling machine and filling the bottles using a filler; and
covering the bottles as they are transferred between the labeling machine and the filler.

17. The method of claim 16, wherein covering the bottles includes deterring glue-containing air from diffusing into the filler using a cover.

18. The method of claim 16, wherein receiving the preforms from the molding machine includes receiving the preforms at an infeed starwheel of the blow molding machine from a pitch changing starwheel of the molding machine, the pitch changing starwheel to change a pitch of the preforms prior to the preforms being received by the molding machine.

19. A method of producing plastic bottles, the method comprising:
manufacturing preforms for plastic bottles using a molding machine;
receiving the preforms from the molding machine and stretch blow molding the preforms into bottles using a blow molding machine, wherein receiving the preforms from the molding machine includes receiving the preforms at a first infeed starwheel of the blow molding machine from a pitch changing starwheel of the molding machine, the pitch changing starwheel to change a pitch of the preforms prior to the preforms being received by the molding machine; and
receiving the bottles from the blow molding machine and labeling the bottles using a labeling machine, the molding machine being bloc-synchronized with the blow molding machine to space the molding machine a first distance from the blow molding machine and the blow molding machine being bloc-synchronized with the labeling machine to space the blow molding machine a second distance from the labeling machine,
wherein receiving the bottles from the blow molding machine includes receiving the bottles at a second infeed starwheel of the labeling machine from a transfer wheel interposed between the blow molding machine and the labeling machine.

20. The method of claim 19, further including receiving the bottles from the labeling machine and filling the bottles using a filler, further including covering the bottles as they are transferred between the labeling machine and the filler.

* * * * *